Figure 1:
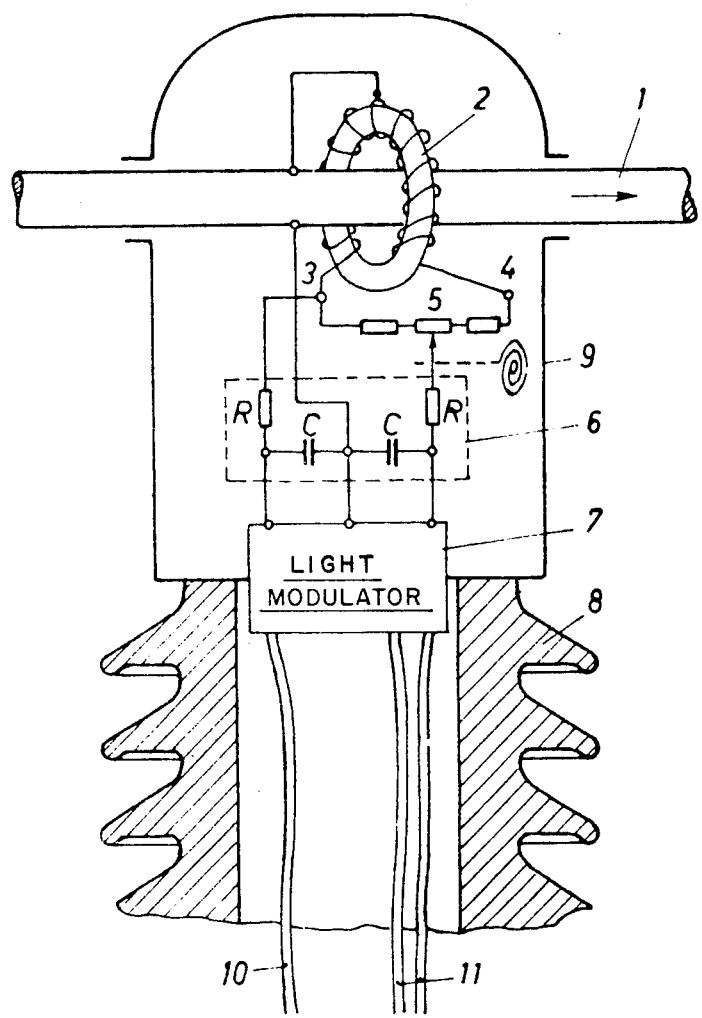

United States Patent
von Willisen

[15] 3,666,956
[45] May 30, 1972

[54] METHOD AND APPARATUS FOR TELEMETERING BY MEANS UTILIZING MODULATED LIGHT BEAMS

[72] Inventor: Friedrich Karl von Willisen, Zurich, Switzerland

[73] Assignee: Aktiengesellschaft Brown, Boveri & Cie, Baden, Switzerland

[22] Filed: Dec. 23, 1969

[21] Appl. No.: 887,585

Related U.S. Application Data

[63] Continuation of Ser. No. 601,646, Dec. 14, 1966, Pat. No. 3,506,833.

[30] Foreign Application Priority Data

Feb. 3, 1966 Switzerland ..................1555/66

[52] U.S. Cl..............................................250/199, 325/60
[51] Int. Cl. ......................................................H04b 9/00
[58] Field of Search ..................250/199; 325/45, 47, 48, 50, 325/60

[56] References Cited

UNITED STATES PATENTS

| | | | |
|---|---|---|---|
| 2,020,327 | 11/1935 | Purington | 325/50 X |
| 3,290,504 | 12/1966 | Vallese et al. | 250/199 |
| 3,454,771 | 7/1969 | Sterzer | 250/199 |

Primary Examiner—Benedict V. Safourek
Attorney—Pierce, Scheffler & Parker

[57] ABSTRACT

A method and arrangement for transmission and electronic evaluation of a modulated light beam used for telemetry in which the modulation signal appears as an argument of a sinusoidal function. The modulated sinusoidal function is transformed into two parallel signals phase-shifted by $\pi/2$ which are subsequently converted at a receiving station into two correspondingly phase-displaced electrical signals. The electrical signals are then mixed multiplicatively with sinusoidal signals phase displaced by $\pi/2$ having a fixed angular frequency, the products resulting from the multiplicative mixing are added, and the latter are then frequency-demodulated.

3 Claims, 2 Drawing Figures

METHOD AND APPARATUS FOR TELEMETERING BY MEANS UTILIZING MODULATED LIGHT BEAMS

This application is a continuation of application Ser. No. 601,646, filed Dec. 14, 1966 now U.S. Pat. No. 3,506,833 granted April 14, 1970.

The present invention concerns a method and an arrangement for the transmission and electronic evaluation of light beams used for telemetry, which are so modulated that the modulation signal, which preferably does not depend linearly on time appears as an argument of a sinusoidal function.

Such modulated beams result, for example, in interferometers of the Michelson principle with moving mirrors (J. Opt. Soc. Am. Vol. 47 (1957), pp. 1,097–1,103), where the interferometrically modulated beams are transformed by means of photodetectors into electrical signals which have the form $$i = i_o (1 + K \cos \psi(t)) \qquad 1.$$

where $i$ is the electrical current signal, $i_o$ and $K$ are constants, and $\psi(t)$ is the modulation function which must be recovered after the transmission from the measuring site to the indicating site. $K$ can be equated with 1 in good approximation. It can be seen immediately how difficult it is to obtain $\psi(t)$ from the signal $i$, if we assume as the modulation function a form $$\psi(t) = \hat{\varphi} \sin \omega_L t \qquad 2.$$

(oscillation of amplitude $\hat{\varphi}$ and of angular frequency $\omega_L$). By substituting (2) in (1) we obtain for $i$ Bessel functions as a rule including a DC portion.

The problem of a recovery of the function $\psi(t)$ as error-free as possible from the signal $i$ is of particular technical importance if the modulating interferometer is coupled, for example, with a high-voltage transmission line and the beam which is transmitted from a potential-free ground station to the interferometer, having a high voltage potential, and back to the ground station, serves to transmit an analog signal of the line current.

Obviously because of the above-indicated difficulties, only one system is known so far in this field where a GaAs diode, which is at high voltage potential is caused by an electrical means, which is likewise at potential and coupled with the high voltage lines, to emit light impulses and the light impulses are evaluated electrically after transmission to the ground station. The disadvantage of this system is readily understandable from the fact that difficulties result here in the voltage supply and attendance.

It is the object of the present invention to solve the above described problem and to provide an electronic system by means of which beams of the above mentioned type of modulation can be both transmitted and evaluated with a minimum of errors.

This problem is solved in such a way that the sinusoidal function containing the modulation function in the argument is transformed into two parallel signals, phase-shifted by $\pi/2$, which are then mixed multiplicatively, after the transformation into electrical signals, with parallel sinusoidal signals, phase-shifted by $\pi/2$, of a fixed frequency after which the products are added in an adding stage and the outgoing signal of the adding stage is frequency-demodulated.

The splitting of the sinusoidal function into two parallel signals, phase-shifted by $\pi/2$, has the result that amplitude disturbances of the original signal appear as identical amplitude disturbances of the two orthogonal signals. The same holds true for disturbances on the transmission zone. By processing the orthogonal signals subsequently in such a way that the modulation function can be recovered at the end by frequency-demodulation, the above mentioned errors can only enter reduced into the measurement, as it can be shown by a calculation.

Figure 2:
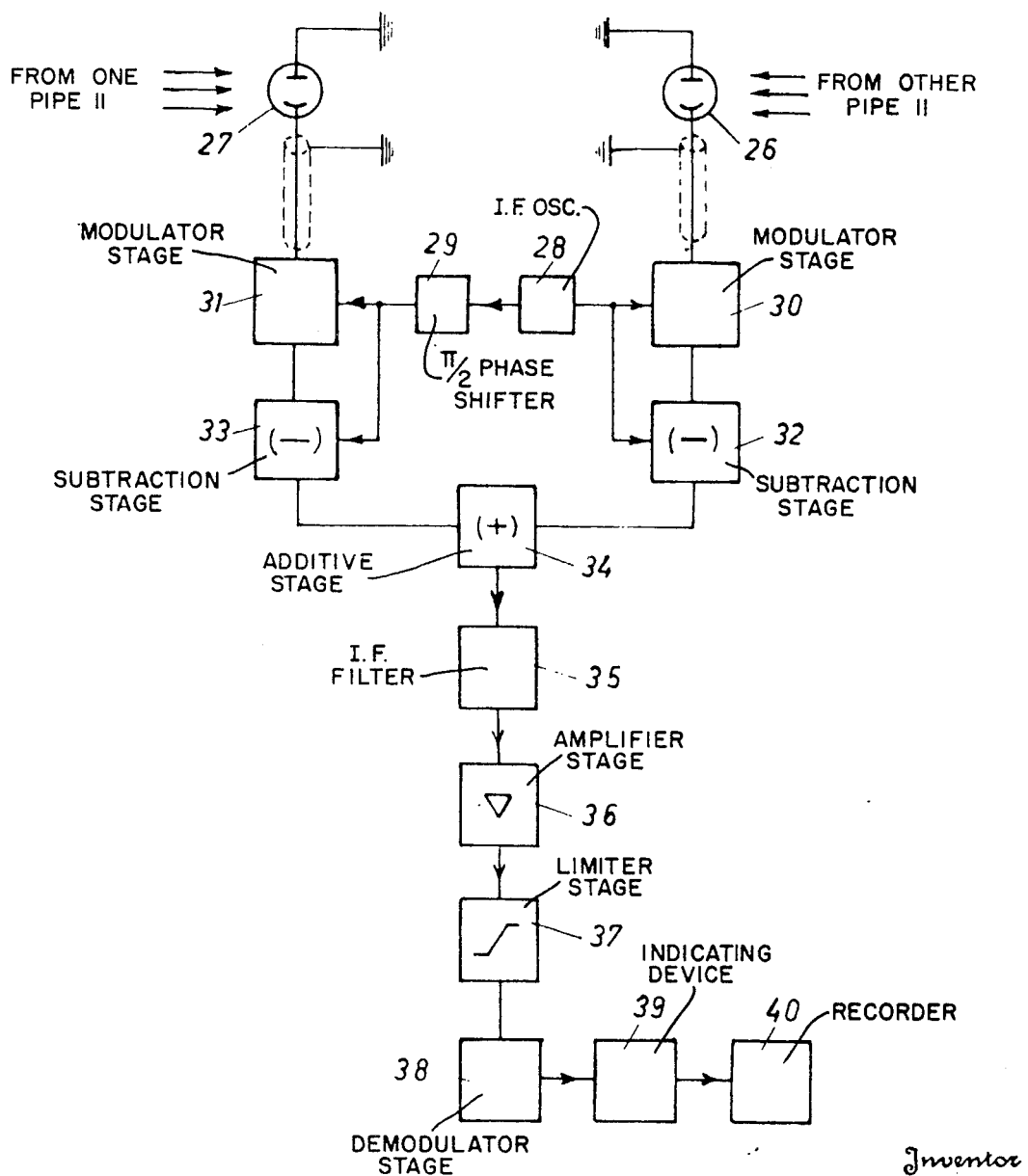

Other advantages and features of the invention will be apparent from the following embodiment as illustrated in the accompanying drawings, wherein:

FIG. 1 shows schematically a measuring head with an interferometric light modulator coupled with a high voltage line; and FIG. 2 shows the block circuit diagram of an arrangement for the electronic evaluation of the beams modulated in the device according to FIG. 1.

With reference now to the drawings, FIG. 1 shows the principal construction and the wiring diagram of the measuring head at high voltage potential of a device for telemetering the current in a high voltage line. The conductor 1 is enclosed by the current transformer 2 whose output at terminals 3, 4 is connected by a voltage divider with the potentiometer 5, from which an output signal is tapped which feeds the light modulator 7 over an integration circuit 6.

Tubular insulator 8 carries the measuring head enclosed by the housing 9. A monochromatic light source, not represented, for example, a gas-laser, is arranged at the foot of insulator 8 and produces a beam which is fed via the glass fiber bundle 10, arranged in the interior of insulator 8, to the light modulator 7. The latter emits two light beams, intensity-modulated by interference phenomena, whose intensity distributions in time are phase-shifted by 90° and which are fed via the glass fiber bundles 11 to a receiver with photo-detectors, not represented in FIG. 1, which is at ground potential. The intensity of the modulated beam has the form $$S = S_o (1 + m \cos \psi(t)) \qquad 3.$$

where $S_o$ and $m$ are constants, and $m \approx 1 \cdot \phi(t)$ is the modulation function.

The light intensities phase-shifted by $\pi/2$ emerging from the light modulator have then the form $$S_1 = S'_o (1 + \cos \phi(t)) \qquad 4. \text{ and}$$
$$S_2 = S''_o (1 + \sin \phi(t)) \qquad 5.$$

FIG. 2 shows the receiver for the light signals arriving from the light modulator 7 via the light guides 11 at the indicating site on the ground.

The light signals are fed to photo-detectors 26, 27 via the light guides 11 and produce electrical signals of the form $$i_1 = i'_o (1 + \cos \psi(t)) \qquad 6. \text{ and}$$
$$i_2 = i''_o (1 + \sin \psi(t)) \qquad 7.$$

After splitting off the DC components, which as a rule are of no interest, we obtain electrical signals of the form $$i = \cos \phi \qquad 8. \text{ and}$$
$$i^* = \sin \phi \qquad 9.$$

These are transformed with sinusoidal oscillations, phase-shifted by $\pi/2$, of fixed frequency $\omega_o$ in modulation stages 30, 31 to amplitude-modulated signals of the form $$g_1 = (1 + i) \cos \omega_o t \qquad 10. \text{ and}$$
$$g_2 = (1 + i^*) \sin \omega_o t \qquad 11.$$

where the carrier signals $$g = \cos \omega_o t \qquad 12. \text{ and}$$
$$g^* = \sin \omega_o t \qquad 13.$$

are produced by an intermediate frequency oscillator 28 with attached phase shifter 29. These carrier signals are then subtracted in the amplitude subtraction stages 32, 33 from the signals $g_1$ and $g_2$ so that signals of the form $$g'_1 = i \cdot \cos \omega_o t \qquad 14. \text{ and}$$
$$g'_2 = i^* \sin \omega_o t \qquad 15.$$

are obtained, which represent thus products of the sinusoidal function to be processed and the sinusoidal oscillation of fixed frequency.

By adding the signals $g'_1$ and $g'_2$ we obtain finally the signal $$G(t) = \cos (\omega_o t - \hat{\phi} \sin \omega_L t) \qquad 16.$$

when we set $$\phi = \hat{\phi} \sin \omega_L t \qquad 17.$$

where $\omega_L$ is the angular frequency of the line current.

The signal $G(t)$ has the form of a phase-modulated oscillation. For the reception of phase-modulated oscillations are used in practice almost exclusively FM receivers which reproduce the angular frequency $\omega = d\phi/dt$. Since the transmission of the measuring quantity, the current $I(t)$, is a process of finite band width, it is in the interest of a faithful reproduction of the frequency spectrum to transform the phase modulation into a frequency modulation. This is done simply by integrating the output signal $\phi(t)$ of the transformer 2 in the integration circuit 6 (FIG. 1), which has an integrating RC-circuit, so that with an output signal of the current transformer according to (17), the signal acting as a modulation function becomes $$\phi'(t) = \int \phi(t) \, dt \qquad 18.$$

and the function of interest $\phi(t)$ is obtained immediately in a frequency-demodulation, because of $$\frac{d\phi'(t)}{dt} = \phi(t).$$

The signal emitted from the additive stage 34 is fed via the intermediate frequency filter 35, the amplifier 36, and the limiting circuit 37 to the demodulator 38 whose output signal is proportional to the measuring quantity and is fed to an indicator 39 or a recording device 40.

For the compensation of the temperature coefficient of the light modulator 7 is provided a bimetal-controlled potentiometer 5 which varies in dependence on the temperature the signal tapped from the output voltage divider of the current transformer.

I claim:

1. In the method for transmission and electronic evaluation of a first light beam used for telemetry the intensity of which is so modulated that it is proportional to sine $\phi(t)$, where $\phi(t)$ is the modulating signal depending on time ($t$), the steps which include:

generating in addition to said first modulated light beam a second light beam the intensity of which is so modulated that it is proportional to cos $\phi(t)$, where $\phi(t)$ is the above-defined modulating signal, said second light beam being thus shifted in phase by $\pi/2$ to said first light beam, transmitting said first and second light beams via separate optical paths, transforming said first and second light beams into corresponding first and second phase-shifted electrical signals, generating two other electrical sinusoidal signals phase-shifted by $\pi/2$ relative to one another and having a fixed angular frequency, multiplicatively mixing said first and second electrical signals respectively with said other phase-shifted electrical signals, adding the products resulting from said multiplicative mixing, and frequency-demodulating the added products, whereby the modulating signal $\phi(t)$ is obtained.

2. The method as defined in claim 1 and which includes the further step of integrating the modulation signal with respect to time before using it for modulation of the light beam.

3. An arrangement at a receiving station for electronically evaluating two transmitted modulated light beams which are displaced in phase by $\pi/2$, which comprises a pair of photo-detectors each of which receives and transforms one of said modulated light beams into a corresponding electrical signal, a pair of amplitude modulation stages for and connected respectively to the outputs of said photo-detectors, an intermediate frequency oscillator, means connecting the output from said intermediate frequency oscillator directly to one of said modulation stages and indirectly through a $\pi/2$ phase shifter to the other modulation stage, a pair of subtraction stages each of which has one output connected respectively to the outputs of said modulation stages, one of said subtraction stages having as a second input thereto the oscillator output signal to one modulation stage and the other subtraction stage having as a second input thereto the oscillator output signal to the other modulation stage subsequent to the $\pi/2$ phase shift of said signal, said subtraction stages serving to separate the oscillator frequency from the amplitude-modulated signals, an adding stage receiving as inputs thereto the respective outputs from said subtraction stages for adding the amplitude-modulated signals separated from the oscillator frequency, an intermediate frequency filter connected to the output from said adding stage, an amplifier stage connected to the output from said filter, a demodulator stage connected to the output from said amplifier stage, and an indicating and/or recording device connected to the output from said demodulator stage.

* * * * *